US009830653B2

United States Patent
West et al.

(10) Patent No.: US 9,830,653 B2
(45) Date of Patent: Nov. 28, 2017

(54) SYSTEM AND METHOD FOR DISPLAYING RISK DATA IN AN ELECTRONIC TRADING ENVIRONMENT

(71) Applicant: Trading Technologies International, Inc., Chicago, IL (US)

(72) Inventors: Robert A. West, Chicago, IL (US); Michael J. Burns, Riverside, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 14/290,946

(22) Filed: May 29, 2014

(65) Prior Publication Data

US 2014/0379548 A1 Dec. 25, 2014

Related U.S. Application Data

(63) Continuation of application No. 13/912,123, filed on Jun. 6, 2013, now Pat. No. 8,775,289, which is a continuation of application No. 13/626,887, filed on Sep. 26, 2012, now Pat. No. 8,484,114, which is a continuation of application No. 13/468,637, filed on May 10, 2012, now Pat. No. 8,311,919, which is a continuation of application No. 13/239,996, filed on Sep. 22, 2011, now Pat. No. 8,204,811, which is a continuation of application No. 12/768,670, filed on Apr. 27, 2010, now Pat. No. 8,046,282, which is a (Continued)

(51) Int. Cl.
*G06Q 40/04* (2012.01)
*G06Q 40/00* (2012.01)
*G06Q 40/06* (2012.01)

(52) U.S. Cl.
CPC ............ *G06Q 40/04* (2013.01); *G06Q 40/00* (2013.01); *G06Q 40/06* (2013.01)

(58) Field of Classification Search
CPC ..................................................... G06Q 40/04
USPC ........ 705/35, 36 R, 37; 707/103 R; 715/804, 715/738
See application file for complete search history.

(56) References Cited

U.S. PATENT DOCUMENTS 5,673,028 A   9/1997 Levy
5,714,971 A * 2/1998 Shalit et al. .................. 715/804
(Continued)

OTHER PUBLICATIONS

Kavuri, R., "ABAP Program to Read/Populate Selection Screen Parameters Dynamically," SAP AG, Oct. 26, 2006, pp. 1-12.
(Continued)

*Primary Examiner* — Samica L Norman
(74) *Attorney, Agent, or Firm* — McDonnell Boehnen Hulbert & Berghoff LLP

(57) ABSTRACT

An example graphical interface and method for displaying risk related data are described. One example graphical interface includes a data structure comprising a plurality of data nodes and at least one risk data point associated with each node, and further comprises a display grid. The display grid includes one or more cells that are used for displaying selected data nodes and risk data points. Each cell may be associated with a single data node, and may include one or more identifiers corresponding to risk data points of the data node. In one example embodiment, the identifiers are aligned along a single axis, and risk related data corresponding to each identifier is aligned with respect to each corresponding identifier.

18 Claims, 8 Drawing Sheets

Related U.S. Application Data continuation of application No. 10/950,916, filed on Sep. 27, 2004, now Pat. No. 7,739,164, which is a continuation-in-part of application No. 10/680,455, filed on Oct. 7, 2003, now Pat. No. 7,752,118.

(56) References Cited

U.S. PATENT DOCUMENTS

| | | | |
|---|---|---|---|
| 6,012,067 A | 1/2000 | Sarkar | |
| 6,305,007 B1 | 10/2001 | Mintz | |
| 6,380,947 B1 | 4/2002 | Stead | |
| 6,408,282 B1 | 6/2002 | Buist | |
| 6,681,211 B1* | 1/2004 | Gatto | 705/36 R |
| 6,691,282 B1 | 2/2004 | Rochford et al. | |
| 6,772,132 B1 | 8/2004 | Kemp, II et al. | |
| 6,957,383 B1 | 10/2005 | Smith | |
| 6,966,033 B1* | 11/2005 | Gasser et al. | 715/738 |
| 7,075,552 B2 | 7/2006 | Herbert et al. | |
| 7,117,517 B1 | 10/2006 | Milazzo et al. | |
| 7,127,424 B2 | 10/2006 | Kemp, II et al. | |
| 7,146,336 B2* | 12/2006 | Olsen et al. | 705/37 |
| 7,197,701 B2 | 3/2007 | Hofmann | |
| 7,228,289 B2 | 6/2007 | Brumfield et al. | |
| 7,389,268 B1 | 6/2008 | Kemp, II et al. | |
| 7,739,164 B1 | 6/2010 | West et al. | |
| 7,752,118 B1 | 7/2010 | West et al. | |
| 7,774,249 B1 | 8/2010 | West et al. | |
| 8,046,282 B2 | 10/2011 | West et al. | |
| 8,204,811 B2 | 6/2012 | West et al. | |
| 8,311,919 B2 | 11/2012 | West et al. | |
| 8,484,114 B2 | 7/2013 | West et al. | |
| 8,775,289 B2 | 7/2014 | West et al. | |
| 2002/0004774 A1* | 1/2002 | Defarlo | 705/36 |
| 2002/0010673 A1* | 1/2002 | Muller et al. | 705/37 |
| 2002/0049713 A1 | 4/2002 | Khemlani et al. | |
| 2002/0099644 A1 | 7/2002 | Kemp, II et al. | |
| 2003/0009411 A1 | 1/2003 | Ram et al. | |
| 2003/0105771 A1* | 6/2003 | Tiefenbrun et al. | 707/103 R |
| 2003/0182220 A1 | 9/2003 | Galant | |
| 2004/0117292 A1 | 6/2004 | Brumfield et al. | |
| 2006/0195386 A1 | 8/2006 | Glodjo et al. | |
| 2010/0211525 A1 | 8/2010 | West et al. | |
| 2012/0011042 A1 | 1/2012 | West et al. | |
| 2012/0226597 A1 | 9/2012 | West et al. | |
| 2013/0024355 A1 | 1/2013 | West et al. | |
| 2014/0108217 A1 | 4/2014 | West et al. | |

OTHER PUBLICATIONS

Shah, S., et al., "Maintaining Coherency of Dynamic Data in Cooperating Repositories," Proceedings of the 28th Very Large Data Base (VLDB) Conference, Hong Kong: China, 2002, pp. 526-537.

Wu, S., et al., "Dynamic Data Management for Location Based Services in Mobile Environments," Proceedings of the Seventh International Database Engineering and Applications Symposium (IDEAS '03), IEEE Computer Society, Jul. 16-18, 2003, pp. 180-189.

* cited by examiner

FIG. 4

| RISK DISPLAY 400 | | ACCT | TRAD 1 | iFCE Aug | ZF Sep03 | ZN Sep03 | FDAX/FESX | FESX | FDAX |
|---|---|---|---|---|---|---|---|---|---|
| ACCT | H | 1342.68 | 1543.04 | 23.06 | 720.00 | 1440.00 | 1672.14 | 1614.48 | 57.66 |
| TRADER 1 | L | -1707 | -1526.96 | -1914.31 | -680.00 | -430.00 | 0.00 | 0.00 | 0.00 |
| jFCE Aug03 | $ | 666.61 | 517.83 | -1395.37 | -680.00 | 1440.00 | 1153.20 | 1095.54 | 57.66 |
| ZF Sep03 | P | OPEN | OPEN | -9 | 0 | 0 | OPEN | 9 | 0 |
| ZN Sep03 | | | | | | | | | |
| FDAX/FESX | | | | | | | | | |
| FESX | | | | | | | | | |
| FDAX | | | | | | | | | |
| TRADER 2 | H | | TRAD 2 | FGBL Sep | ZN Sep03 | | | | |
| FGBL Sep03 | L | | 369.02 | 369.02 | 450.00 | | | | |
| ZN Sep03 | $ | | -161.45 | -184.51 | -60.00 | | | | |
|  | P | | 263.15 | -126.85 | 390.00 | | | | |
|  |   | | OPEN | -1 | 1 | | | | |
| TRADER 3 | H | | TRAD 3 | FESX Sep | FGBL Sep | | | | |
| FESX Sep03 | L | | 11.53 | 11.53 | 0.00 | | | | |
| FGBL Sep03 | $ | | -542.00 | -103.79 | -449.75 | | | | |
| ZN Sep03 | P | | -27.41 | -57.66 | -449.75 | | | | |
|  |   | | CLOSED | -1 | 1 | | | | |
| TRADER 4 | H | | TRAD 4 | FDAX Sep | FESX Sep | ZN Sep03 | | | |
| FDAX Sep03 | L | | 709.22 | 605.43 | 103.79 | 480.00 | | | |
| FESX Sep03 | $ | | -72.08 | -72.08 | -207.58 | 0.00 | | | |
|  | P | | 23.04 | 230.64 | -207.58 | 480.00 | | | |
|  |   | | OPEN | -2 | 6 | 0 | | | |
| TRADER 5 | H | | TRAD 5 | ZF Sep03 | ZN Sep03 | | | | |
| ZF Sep03 | L | | 0.00 | 120.00 | 0.00 | | | | |
| ZN Sep03 | $ | | -190.00 | -30.00 | -230.00 | | | | |
|  | P | | -110.00 | 120.00 | -230.00 | | | | |
|  |   | | CLOSED | 0 | 0 | | | | |

402 — ACCT
404 — (window)
406, 408, 410 — row indicators
412, 414 — column indicators (ACCT, TRAD 1)

RISK DISPLAY 700

ACCT  702

TRADER 1
├─ FCE Aug03
├─ ZF Sep03
├─ ZN Sep03
└─ FDAX/FESX
    ├─ FESX
    └─ FDAX

TRADER 2
├─ FGBL Sep03
└─ ZN Sep03

TRADER 3
├─ FESX Sep03
├─ FGBL Sep03
└─ ZN Sep03

TRADER 4
├─ FDAX Sep03
└─ FESX Sep03

TRADER 5
├─ ZF Sep03
└─ ZN Sep03

| | W/B | NP | | NP | W/S | P/L |
|---|---|---|---|---|---|---|
| T1 | 5 | | ZT | -9 | | 517.83 ← 728 |
| | 10 | | ZF | | | -1395.37 |
| | | | ZN | | | -680.0 |
| | | | ZB | | -5 | 1440.0 |
| | | | | | | 1153.2 |
| T2 | 100 | 1 | FGBL | -1 | | 263.15 |
| | | | ZN | | | -126.85 |
| | | | | | | 390.0 |
| T3 | | | FESX | | | -27.41 |
| | | | FGBL | | | -57.66 |
| | | | ZN | | | -449.75 |
| | | | | | | 480.0 |
| T4 | | 6 | FDAX | -2 | | 23.04 |
| | | | FESX | | | 230.64 |
| | | | | | | -207.58 |
| T5 | | | ZF | | | -110.00 |
| | | | ZN | | | 120.0 |
| | | | | | | -230.0 |

Column pointers: 716, 718, 720, 722, 724, 726
Row pointers: 704, 706, 708, 710, 712, 714

FIG. 7

SYSTEM AND METHOD FOR DISPLAYING RISK DATA IN AN ELECTRONIC TRADING ENVIRONMENT

CROSS REFERENCE TO RELATED APPLICATIONS

This application is a continuation of U.S. patent application Ser. No. 13/912,123, filed on Jun. 6, 2013, now U.S. Pat. No. 8,775,289, which is a continuation of U.S. patent application Ser. No. 13/626,887, filed on Sep. 26, 2012, now U.S. Pat. No. 8,484,114, which is a continuation of U.S. patent application Ser. No. 13/468,637, filed on May 10, 2012, now U.S. Pat. No. 8,311,919, which is a continuation of U.S. patent application Ser. No. 13/239,996, filed on Sep. 22, 2011, now U.S. Pat. No. 8,204,811, which is a continuation of U.S. patent application Ser. No. 12/768,670, filed on Apr. 27, 2010, now U.S. Pat. No. 8,046,282, which is a continuation of U.S. patent application Ser. No. 10/950,916, filed on Sep. 27, 2004, now U.S. Pat. No. 7,739,164, which is a continuation-in-part of U.S. patent application Ser. No. 10/680,455, filed on Oct. 7, 2003, now U.S. Pat. No. 7,752,118, the contents of all of which are fully incorporated herein by reference for all purposes.

TECHNICAL FIELD

The present invention is directed towards electronic trading. More specifically, the present invention relates to a system and method for providing a grid for displaying risk related information such as P/L and net position, and/or order related information, while permitting a user to easily distinguish and control the displayed values.

BACKGROUND

In recent years, a trend towards electronic trading has become well-established, causing one major exchange after another to replace or at least supplement the traditional open outcry, where a trade is done face to face, with automated electronic systems which automatically match bids and offers. While the motivation behind using electronic trading may vary from market to market, greater efficiency and volume are some of the considerations.

Electronic trading is generally based on a host exchange, one or more computer networks and client devices. An electronic exchange provides a matching process between buyers and sellers. Some well known electronic exchanges include Eurex, London International Financial Futures and Options Exchange ("LIFFE"), Euronext, Chicago Mercantile Exchange ("CME"), Chicago Board of Trade ("CBOT"), and Xetra. Buyers and sellers, collectively referred to as traders, are typically connected to one or more electronic exchanges by way of communication links. Traders submit buy and sell orders to the electronic exchange over the communication links. They also obtain price information and other fill information from the exchange.

An electronic exchange can list any number of tradeable objects. Often times, traders will trade simultaneously in more than one tradeable object, and they may trade simultaneously tradeable objects that are listed at more than one exchange. Ordinarily, each tradeable object has its own electronic market, and therefore, its own separate stream of market information. Therefore, in these instances, the traders will generally receive more than one stream of market information such that each stream of market information attempts to characterize a given tradeable object. In addition to receiving market information from exchanges, a trader might subscribe to news feeds to receive real-time data that may assist the trader in making their trading decisions.

As used herein, the term "tradeable object" refers to anything that can be traded with a quantity and price. For example, tradeable objects may include, but are not limited to, all types of traded financial products, such as, for example, stocks, options, bonds, futures, currency, and warrants, as well as funds, derivatives, and collections of the foregoing. Moreover, tradeable objects may include all types of commodities, such as grains, energy, and metals. Also, a tradeable object may be "real," such as products that are listed by an exchange for trading, or "synthetic," such as a combination of real products that is created by the trader. A tradeable object could be actually a combination of other tradeable objects, such as a class of tradeable objects.

Generally, when a trader submits an order to a host exchange, the host checks the conditions associated with the order, such as price and quantity, and prioritizes the order with other orders of the same price. When the order conditions are satisfied in the market, a trade occurs and trade information is then relayed in some fashion to one or more client devices. In fact, as indicated earlier, a host exchange typically publishes a data feed to the client devices so that the traders can have access to the most current market update information.

Also, as trader's orders get filled, a trader typically wishes to view fill data related to his trades during a trading day, including his net position, and profit and loss ("P/L") information that is determined based on the received fills. The existing applications for displaying P/L related information and a trader's net position are often limited in terms of their utility. It is often cumbersome for a trader to set them up, since they often require a trader to set up different filters to be used for calculating P/L and other risk related values, such as net positions being held by a trader in relation to a plurality of tradeable objects. The existing applications are also limiting in terms of how much information can be displayed in relation to one window based on the set up filters, and multiple windows may be required to view risk data corresponding to different account numbers, different tradeable objects, or different currencies, for example. As the number of trader's accounts or tradeable objects being traded by a trader increases, setting of all desirable filters for each window and viewing all windows that display trader's risk data on a computer screen may be difficult or even impossible. The burden of configuring such windows and viewing the displayed information further multiplies when it is a risk manager administrator rather than an individual trader who is trying to monitor and manage multiple accounts and/or multiple traders.

It is still desirable for electronic trading applications to offer tools that can assist a trader in trading in an electronic trading environment, help making profitable trades in a speedy and accurate manner, while allowing the trader to conveniently configure and control trader-related information such as P/L and net position.

BRIEF DESCRIPTION OF THE DRAWINGS

Example embodiments of the present invention are described herein with reference to the following drawings, in which:

FIG. 4 is a block diagram illustrating a risk display interface including a data space and a grid display according to one example embodiment;

FIG. 7 is a block diagram illustrating a second alternative embodiment of a risk display interface according to one example embodiment.

DETAILED DESCRIPTION

I. Risk Related Grid Display

Figure 1:
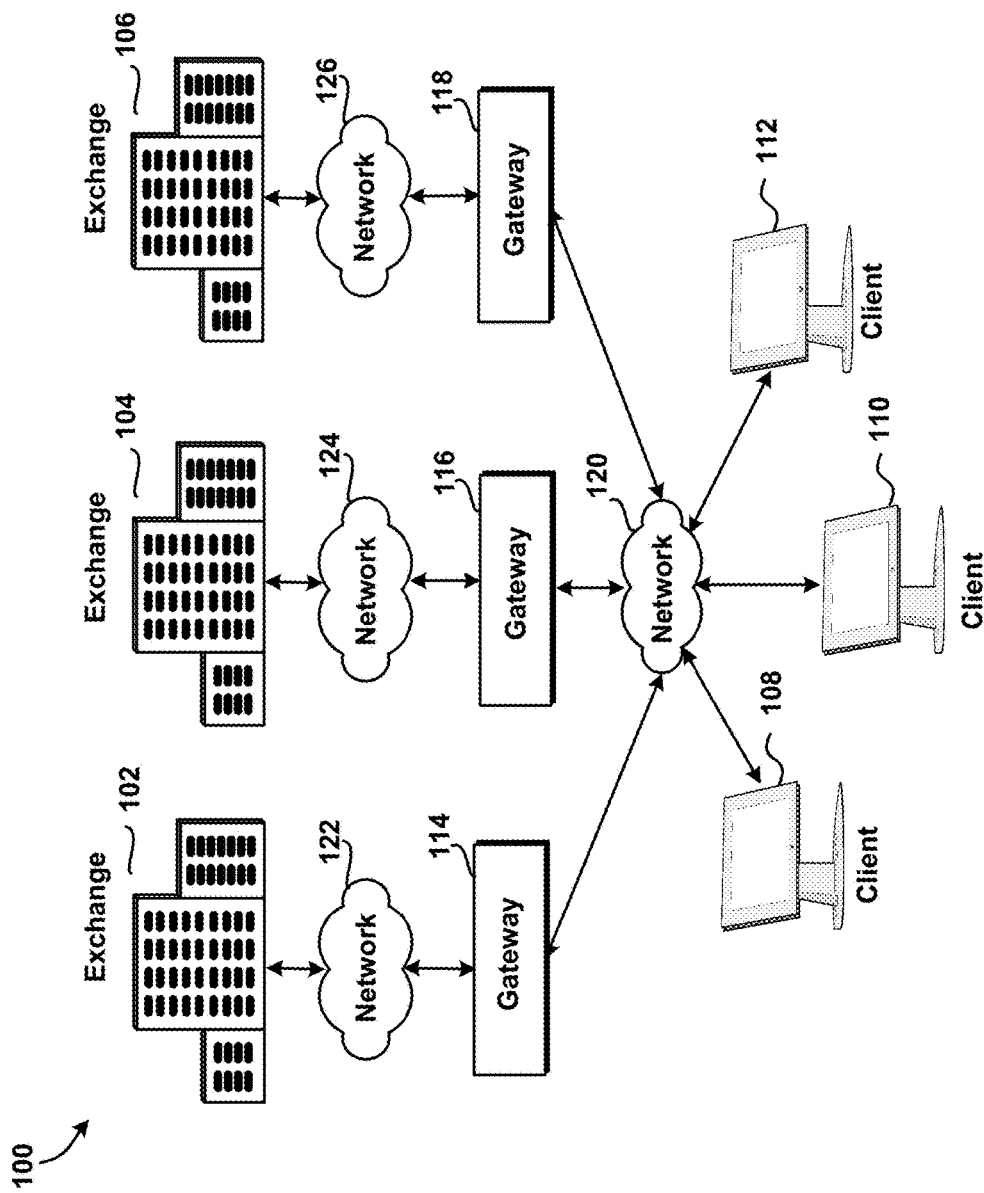
FIG. 1 is an example network configuration for a communication system utilized to access one or more electronic exchanges.

According to example embodiments, a system and method are developed for providing a display including a grid display interface that displays trader-related risk information such as P/L and net position related information. More specifically, the grid display interface allows for display of a large number of data spaces so that a trader can easily and quickly distinguish the displayed data based on any data grouping used by a trader to create the grid. Also, while the grid display interface allows a trader to view a large number of risk data points, it is also space-efficient.

The grid display interface also permits for a convenient and effective configuration and grouping of the displayed data. More specifically, the grid display interface includes a data space arranged in a tree-based data structure including a plurality of data nodes. In the tree-based data structures, records are stored in locations called leaf nodes, which are at the end points of a tree branch node that is a sum of all leaf nodes. Also, each branch node may include a plurality of sub-branch nodes, and each sub-branch node may hold a plurality of separate leaf nodes. In other words, each node in a tree-based data structure may be thought of as having a specific rank, so that, for example, the leaf nodes associated with independent values have the lowest rank, and a branch node that is a sum of at least two other sub-branches or a number of leaf nodes may have a higher rank, while the tree node that is a sum of all branches has the highest rank of all nodes. In such a configuration, a number of lower rank nodes may also be called "children" of another higher rank "parent" node.

For example, as will be described in greater detail below, a branch node may correspond to a trader's account or a combination of trader's accounts, and leaf nodes under the branch node may correspond to different tradeable objects that a trader is trading under the account(s). If a trader has a number of accounts, the nodes corresponding to different accounts may be considered sub-branches of a branch node corresponding to the sum of all account nodes. The branch node may then be a part of a group of other branch nodes associated with the highest rank tree node that is a sum of all values corresponding to the branch nodes. Using such a tree-based data structure, a trader can quickly and easily locate, place, and manipulate different nodes.

When a user configures the data nodes via the data structure, the selected nodes and risk information corresponding to each selected node may be displayed on a display grid. The display grid interface includes at least one display cell for displaying data corresponding to the data nodes. In an example embodiment, a display cell includes a first region for displaying identifiers associated with each selected data node to be displayed in relation to the display cell. For example, if a data cell is created for a particular trader, the identifiers displayed in the first region may correspond to tradeable objects being traded by that trader. Preferably, the display cell also includes a plurality of additional regions that display risk related data corresponding to and aligned with each displayed identifier in the first region. For example, the additional regions may include a positive net position region and a negative net position region to display positive and negative net positions associated with the tradeable objects corresponding to the tradeable objects' identifiers in the first region. In an example embodiment, each region may be displayed in a column format, and the risk data may be displayed in each respective column.

While the present invention is described herein with reference to example embodiments for particular applications, it should be understood that the present invention is not limited thereto. Those having ordinary skill of art will recognize that many additional modifications and embodiments are possible as well.

II. Hardware and Software Overview

FIG. 1 is a block diagram illustrating an example trading system 100 in accordance with the example embodiments. The system 100 includes one or more exchanges 102, 104, 106 and one or more client devices 108, 110, 112. Intermediate devices such as gateways 114, 116, 118, routers (not shown), and other such types of network devices may be used to connect network 120 to networks 122, 124, and 126 so that client devices 108, 110, 112 and exchanges 102, 104, 106 can communicate market information. It should be understood that the present invention is not limited to any particular system configuration. For example, networks 122, 124, and 126 could represent the same network, network 120 could represent the same network as networks 122, 124, and 126, or client devices 108, 110, 112 could connect separately to gateways 114, 116, 118. Of course, the preferred embodiments may be implemented on many other system configurations.

A. Exchange

Any of exchanges 102, 104, 106 may represent, for example, the London International Financial Futures and Options Exchange ("LIFFE"), the Chicago Board of Trade ("CBOT"), the New York Stock Exchange ("NYSE"), the Chicago Mercantile Exchange ("CME"), the Exchange Electronic Trading ("Xetra," a German stock exchange), or the European Exchange ("Eurex"), or any other exchange that participates in electronic trading. Exchanges 102, 104, 106 might also refer to other facilities, which include basic or more complex systems that automatically match incoming orders. These example exchanges and other exchanges are well known in the art. Communication protocols required for connectivity to one of these exchanges are also well known in the art.

Exchanges 102, 104, 106 allow traders to log into a market to trade tradeable objects. Once a trader logs into a market and submits an order, an exchange may process the order using different execution algorithms, and sometimes the type of algorithm used may depend on the tradeable object being traded. Preferably, the example embodiments can be adapted by one skilled in the art to work with any order execution algorithms. Some example order execution algorithms include first-in-first-out ("FIFO") and pro rata algorithms. The FIFO algorithm, used for some tradeable objects listed with Eurex, for example, gives priority to the first person in an order queue at an exchange to place an order. The pro rata algorithm, used for some tradeable objects listed with LIFFE, for example, splits orders for the same price, and the orders at identical prices are filled in proportion to their size. The present invention is not limited to any particular type of order execution algorithm. It should also be understood that the price order queue is a term that covers a broad range of systems used by an exchange to conduct orderly financial transactions such as, for example, a FIFO based system or a pro rata system.

Regardless of the type of order execution algorithm used, each exchange 102, 104, and 106 preferably provides similar types of information in market updates found in their data feeds to subscribing client devices 108, 110, and 112. Market information may include data that represents just the inside market. The inside market is the lowest sell price (best ask) and the highest buy price (best bid) at a particular point in time.

Market information provided by an exchange may also include market depth. Market depth refers to quantities available at the inside market and can also refer to quantities available at other prices away from the inside market. The quantity available at a given price level is usually provided by the host exchange in aggregate sums. The extent of the market depth available to a trader usually depends on the exchange. For instance, some electronic exchanges provide market depth for all (or most) price levels, some exchanges provide market depth for a finite number of price levels, while some exchanges provide only quantities associated with the inside market, and others may provide no market depth at all. Additionally, exchanges 102, 104, 106 can offer other types of market information, for example, the last traded price ("LTP"), the last traded quantity ("LTQ"), the total traded quantity ("TTQ"), and order fill information. It should be understood that the present invention is not limited to receiving and analyzing a data feed consisting of market updates. One skilled in the art would recognize upon reading the description herein that the present invention has utility in any trading application where any particular type of data feed is provided.

B. Gateway

Gateways 114, 116, and 118 are devices such as a mainframe, super minicomputer, workstation, or microcomputer that connect network 120 to networks 122, 124, 126 so that market information can be successfully passed between client devices 108, 110, 112 and exchanges 102, 104, 106. Gateways 114, 116, 118 receive market information from exchanges 102, 104, 106 and convert it to a form compatible with the protocols used by client devices 108, 110, 112 using conversion techniques known in the art. Also, as known by those skilled in the art, gateways 114, 116, and 118 may have one or more servers to support the data feeds, such as a price server for processing price information, an order server for processing order information, and a fill server for processing fill information. A trader at one of client devices 108, 110, and 112 can subscribe to price information, order information, and fill information for a particular market hosted at exchanges 102, 104, 106. Gateways 114, 116, 118 also receive transaction information, such as orders, order changes, queries, etc., from client devices 108, 110, 112 and forward that information to corresponding exchanges 102, 104, and 106.

C. Client Device

Client devices 108, 110, 112 are devices that provide an interface for traders to trade at one or more markets listed with one, some, or all of exchanges 102, 104, 106. Some examples of client devices include a personal computer, laptop computer, hand-held computer, and so forth. Client devices 108, 110, 112, according to the preferred embodiments, include at least a processor and memory. The processor and memory, which are both well-known computer components, are not shown in the Figure for sake of clarity. Preferably, the processor has enough processing power to handle and process various types of market information. Of course, the more market information is received and processed, the more processing power is preferred. However, any present day processor has enough capability to perform at least the most basic part of the present inventions.

Memory may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include dynamic memory, such as main memory or random access memory ("RAM"). Common forms of computer-readable media include, for example, floppy disks, flexible disks, hard disks, magnetic tape, punch cards, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

Client devices 108, 110, 112 receive market information from any of exchanges 102, 104, 106. According to the preferred embodiment, market information is displayed to the trader(s) on the visual output device or display device of client devices 108, 110, 112. The output device can be any type of display. For example, the display could be a CRT-based video display, an LCD-based or a gas plasma-based flat-panel display, a display that shows three-dimensional images, or some other type of display. The present invention is not limited to any particular type of display.

Upon viewing the market information or a portion thereof, a trader may wish to send orders to an exchange, cancel orders in a market, change orders in a market, query an exchange, and so on. To do so, the trader may input various commands or signals into the client device 104, for example, by typing into a keyboard, inputting commands through a mouse, or inputting commands or signals through some other input device. Upon receiving one or more commands or signals, client devices 108, 110, 112 preferably generate transaction information. For instance, a trader may click a mouse button to initiate an order to buy a tradeable object. Then, transaction information would include an order to buy a particular quantity of the tradeable object at a particular price. There are many different types of messages and/or order types that can be submitted, all of which may be considered various types of transaction information. Once generated, transaction information is sent from client device 104 to host exchange 102 over network(s) 120, 122, 124, 126.

Figure 2:
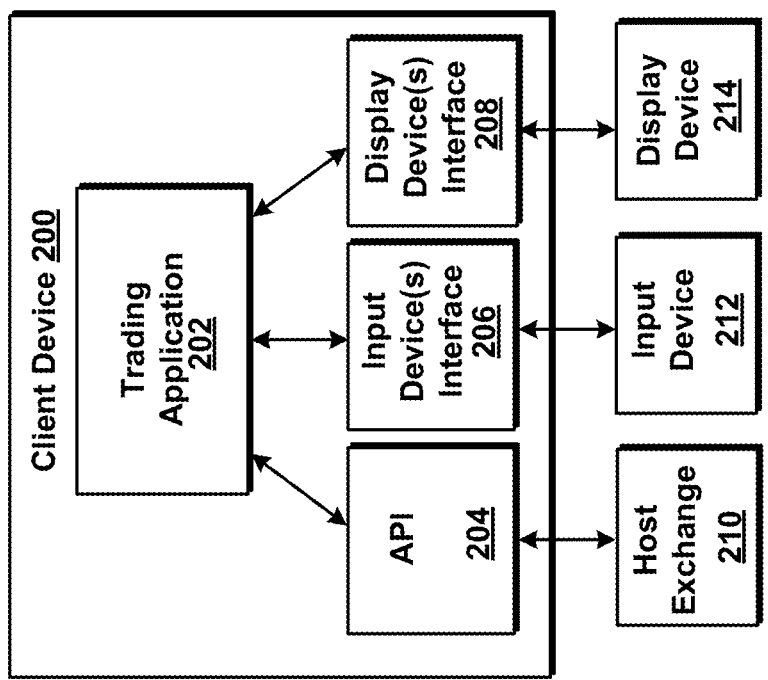
FIG. 2 is a block diagram illustrating an example client device that can be used in the example network of FIG. 1.

FIG. 2 is a block diagram illustrating an example client device 200 which may be similar to the type of client devices 108, 110, and 112 shown in FIG. 1. The client device 200 can be any particular type of computing device, examples of which were enumerated above with respect to the client device. According to the preferred embodiments, the client device 200 has a trading application 202 stored in memory that, when executed, arranges and displays market information in many particular ways, usually depending on how the trader prefers to view the information. The trading application 202 may also implement the preferred embodiments described herein. Alternatively, the preferred embodiments described herein may occur elsewhere such as outside of the trading application 202 on the client device 200, on a gateway, or on some other computing device. Preferably, the trading application 202 has access to market information through an API 204 (or application programming interface), or the trading application 202 could also forward transaction information to the exchange 210 via the API 204. Alternatively, the API 204 could be distributed so that a portion of the API rests on the client device 200 and a gateway, or at the exchange 210. Additionally, the trading application 202 may receive signals from an input device 212 via an input device interface 206, and can be given the ability to send signals to a display device 214 via a display device interface 208.

The trading application 202 can be any commercially available trading application that allows a user to trade is X_TRADER® from Trading Technologies International, Inc. of Chicago, Ill. X_TRADER® also provides an electronic trading interface, referred to as MD Trader™, in which working orders and/or bid and ask quantities are displayed in association with a static axis of prices. However, the preferred embodiments are not limited to any particular product that performs translation, storage and display functions.

Portions of the X_TRADER® and the MD Trader™-style display are described in U.S. Pat. No. 6,772,132, entitled "Click Based Trading With Intuitive Grid Display of Market Depth," filed on Jun. 9, 2000, and U.S. patent application Ser. No. 09/971,087, entitled "Click Based Trading With Intuitive Grid Display of Market Depth and Price Consolidation," filed on Oct. 5, 2001, and U.S. patent application Ser. No. 10/125,894, entitled "Trading Tools for Electronic Trading," filed on Apr. 19, 2002, the contents of each are incorporated herein by reference.

III. Risk Information Grid Display

A system and method are developed that provide a display including a space-efficient grid display interface that displays trader-related risk information, such as P/L and net position. The grid display interface allows for display of a large number of data spaces so that a trader can easily and quickly distinguish the displayed data based on any data grouping used by a trader to create the grid. The example grid display interfaces are also easily configurable and space-efficient.

Before any data is displayed via a grid display interface, a trader or a system administrator may create a data space including a number of data sets to be later mapped to the grid display. It should be understood that the present invention is not limited to a single data space and a single grid display, and more than one data space and the corresponding grid displays could be created based on the trader's preferences. According to an example embodiment, the data space is arranged in a tree-based data structure. A tree-based data structure is used for placing and locating files or folders that are placed in a database. The tree-based structure finds data by repeatedly making choices at decision points called nodes, including the highest rank tree node, lower rank branch nodes, sub-branch nodes, and leaf nodes, which have the lowest rank. Also, each node can be associated with a number of sub-nodes or branches, and a user can move, add, and delete nodes in a tree data structure until a desired tree configuration is created.

Each node in a tree-based data structure includes values. Based on the tree-data configuration, the highest rank tree node is a sum of values associated with all branches that are held by the tree node. Then, similarly, each branch node is a sum of values associated with all sub-branch nodes or leaf nodes that are held by the branch node. In one example embodiment described herein, a node in a tree-based data structure may track P/L and net position values associated with a tradeable object, a trader, or a group of traders depending on the rank level of the node. For example, the highest rank tree node may be associated with an overall net position, and/or profit related information of a trader or a group of traders who trade at one or more electronic exchanges. Then, each branch node under the tree node may correspond to a different trader having a net position and P/L being tracked by the tree node. Then, sub-branch nodes may be associated with a number of account sub-branch nodes corresponding to different accounts being used by the trader of the branch node. Finally, the sub-branch account node may be associated with a number of leaf nodes corresponding to different tradeable objects being traded under the account associated with the sub-branch node.

It should be understood that two or more tradeable object nodes could also be combined to represent an overall P/L and net position associated with the selected tradeable object nodes. Such implementation may be especially useful when a trader wishes to view an overall P/L value and a net position for a spread including two or more tradeable objects being traded as the spread. Also, it should be understood that grouping of fill data could also be based on different criteria. For example, branch nodes may correspond to different exchanges. In such a configuration, a first set of sub-branch nodes corresponding to a specific exchange may be associated with different traders who trade at that exchange, and then each sub-branch node corresponding to a trader may be associated with second sub-branch nodes corresponding to each account being used by the trader to trade at the specific exchange. Then, the sub-branch account nodes may be associated with a number of leaf nodes corresponding to different tradeable objects being traded under each account. It should be understood that any number of sub-branch levels could be used in a tree-based data structure, and a user can create additional sub-branches by merging two or more nodes into a higher rank node. For example, if a trader uses two or more accounts to trade at the same or different exchanges, a trader may merge the account nodes corresponding to the selected accounts into another node that will represent a combined P/L value and a combined net position of the merged accounts.

Also, it should be understood that the tree-based data configuration described above is only one example configuration, and a trader may decide to create a tree-based data structure based on different categories or based on different node groupings. For example, rather than having the highest ranked nodes correspond to an exchange, or to a group of individual traders, another tree-based data structure may be created where the highest rank branch nodes are based on different currencies, such as Dollar ($), Euro (€), Yen (¥), or Pound (£), for example, or any other currency in which tradeable objects are traded by one or more traders. In such an embodiment, each currency branch node may be associated with a number of sub-branch nodes corresponding to accounts that are used by a trader or a group of traders to trade tradeable objects in the defined currency. Each account sub-node may in turn be associated with another set of its own sub-branch nodes corresponding to each tradeable object being traded in the defined currency. Also, if the currency-based tree configuration is created for a number of traders, nodes corresponding to the first sub-branch may correspond to each trader who trades in the defined currency, and then a node corresponding to each trader may be associated with another sub-branch including a number of sub-nodes corresponding to the trader's accounts that in turn may include one or more nodes corresponding to tradeable object(s) being traded under the respective accounts.

In an alternative embodiment, nodes in a tree-based data structure may be grouped based on contract expiration dates. Under such an implementation, a tree node or a branch node corresponding to the front months may be associated with a number of sub-branch nodes corresponding to the tradeable objects having expiration dates during one of the front months defined for the branch node. Similarly, a branch node corresponding to the back months may be associated with a sub-branch corresponding to a number of sub-nodes created for tradeable objects having expiration dates during the back months. Also, under such an implementation, a trader may wish to combine sub-nodes such that a lower number of sub-nodes are grouped together. For example, a trader may wish to view a combined P/L and a combined net position for contracts that expire in September and October, rather than viewing such values for each month separately.

Also, according to an example embodiment, values in each node are dynamically updated based on fill information being received from one or more electronic exchanges. In such an embodiment, when a fill is received, the fill is built into one or more trees. For example, in an exchange-account-tradeable object tree-based data structure, a fill may be first matched to a specific exchange, then one of the accounts, and then to a specific tradeable object. Alternatively, in a currency-based tree, a received fill may be matched to a specific currency in which a tradeable object is traded and then to any other node corresponding to sub-branches.

Figure 3:
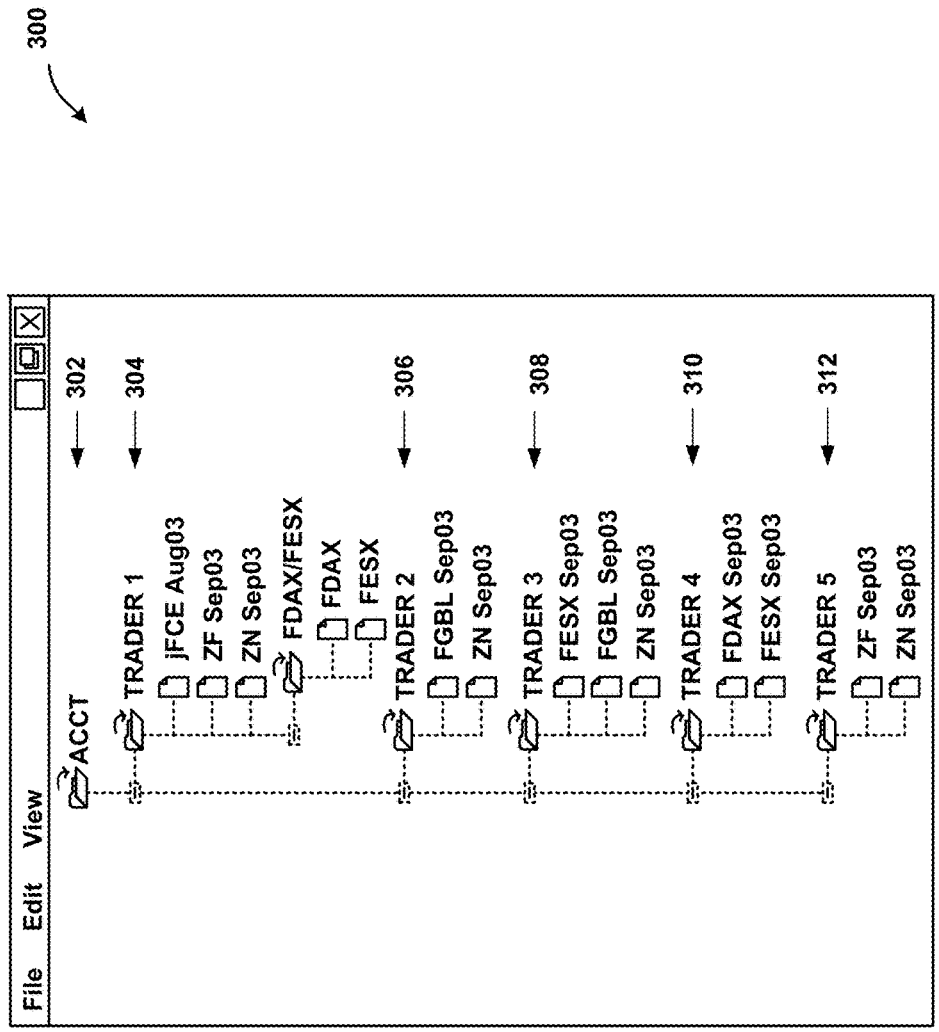
FIG. 3 is a block diagram illustrating an example tree-based data set configuration according to one example embodiment.

FIG. 3 is a block diagram illustrating a tree-based data set configuration 300 according to one example embodiment. The tree-based data set 300 illustrates an account/trader/tradeable object configuration. As illustrated in FIG. 3, the highest rank tree node of the tree-based data set configuration 300 corresponds to an overall account node 302 including a plurality of branch nodes corresponding to a number of traders. Such a configuration may be useful when a risk manager administrator wishes to view overall risk information, such as P/L and net position-related information, for a group of traders, as well as risk information corresponding to each individual trader who is being managed by the risk manager administrator.

As illustrated in FIG. 3, there are five branch nodes 304, 306, 308, 310, and 312 corresponding to five traders, Traders 1-5, who are trading under the combined account corresponding to a node 302. Also, each branch trader node corresponding to an individual trader is associated with a number of sub-branch nodes created for tradeable objects being traded by the trader. For example, as shown in FIG. 3, the node 304 associated with the first trader includes three sub-branch nodes corresponding to three individual tradeable objects: "jFCE Aug03," "ZF Sep03," and "ZN Sep03," and an additional sub-branch level node created for a spread "FDAX/FESX," where each individual tradeable object in the spread has a separate sub-node as well. Similar tradeable object nodes are created for other traders. For example, the branch node 308 corresponds to three sub-branch nodes associated with three tradeable objects "FESX Sep03," "FGBL Sep03," and "ZN Sep03." Also, each trader may use different accounts to trade tradeable objects being offered at different electronic exchanges, for example. In such an embodiment, the tradeable objects may be grouped under separate sub-branches corresponding to the accounts associated with each tradeable object.

Using the tree-based data structure illustrated in FIG. 3, a trader may quickly locate, add, or reconfigure, or perform other changes, such as combining, moving, inserting, or merging, the created nodes. In one embodiment, a number of functional selections may be automatically displayed to a trader upon detecting a predetermined user input. For example, a selection of an "Edit" icon may result in displaying of a pull down menu that lists a number of available functional selections, such as to "Add a new node," "Delete an existing node," "Clear all," etc. Also, when a new node is created, a trader may drag it to a desired location in the tree-based data structure. For example, a new node may be created for a new account, a new tradeable object, or a combination of tradeable objects. Then, a trader or a risk manager administrator may drag such a node and drop it in a desired location in the tree-based data structure. Also, other nodes may be moved under the newly created node. For example, two sub-nodes may be initially created for two tradeable objects being traded as a spread. Then, another node may be created to correspond to a sum of P/L values of the two tradeable objects. In such an embodiment, once a new node is created for the spread, a trader may drag each sub-node corresponding to the individual tradeable objects under the sub-node created for the spread.

In an example embodiment, the graphical interface includes a data structure, such as a tree-based data structure, and a display interface, such as a grid-type display. The data structure shows the form of the data to be displayed, and the grid-type display shows actual data corresponding to each point in the data structure. Once a trader configures a data space, each or some elements of the data space are preferably mapped to a display interface. According to one example embodiment, a trader may select data to be mapped to the display interface. In a tree-based data structure configuration, a trader may select specific nodes, and the values corresponding to the selected nodes may be displayed via the interface. The selection of the specific nodes may be accomplished by selecting particular branches of the tree. For example, referring to FIG. 3, a trader may control which nodes are selected for display by simply opening and closing a folder corresponding to each node. In such an embodiment, when a trader opens a folder corresponding to one of the higher rank nodes, such as a node corresponding to Trader 1, for example, the sub-nodes corresponding to the Trader 1 node are displayed via the interface 300. In such an embodiment, every node and a sub-node displayed via the data space may be automatically displayed on a display interface. Alternatively, a trader may drag and drop the selected nodes from a data space to a display interface. However, it should be understood that different methods could also be used to select which values corresponding to specific nodes are displayed via the display interface.

In addition to creating and selecting nodes to be displayed via a display interface, a trader may select a format of the display interface. For example, the display interface may have a grid display format. In such an embodiment, the data space corresponding to each node may be thought of as arranged in an X by Y data matrix that is then mapped to a display data grid such that the values corresponding to each node are mapped to a cell in a display grid. Therefore, the display data grid may be an interface with X rows and Y columns that form a number of cells. It should be understood that the display data grid may be a static space with a predetermined number of rows and columns. Alternatively, the data grid display may be dynamic in terms of changing a number of rows and columns based on user's selection of nodes to be displayed via the grid display interface. However, it should be understood that the display is not limited to a two-dimensional grid, and three-dimensional grid displays could also be used, where the height of a cell or a portion thereof may indicate the current P/L value, for example.

It should be understood that any layout of the nodes corresponding to a tree-based data structure could be used. For example, main branch nodes may be displayed in a selected column or row, and then leaf nodes corresponding to a branch node may be displayed in relation to a row corresponding to a location in which the branch node is displayed. Alternatively, a user could manually drag selected nodes from a tree-based data structure onto a display grid. Further, alternatively, only problematic nodes, such as nodes corresponding to a critically low P/L value or too high net position could be displayed via the display grid. Also, a number of display grids could be created for a single data structure, where each grid may display nodes selected based on different criteria. It should be understood that display types described in reference to different figures could be combined so that some of the cells can be of a format described in relation to the subsequent FIG. 4, and other cells could have the format described in relation to FIG. 5, 6, or 7.

Each data node in a tree based data structure may be associated with trader related risk data. Additionally, each leaf node corresponding to a predetermined tradeable object may be associated with order related data, such as fills, partial fills, working order data, or any other user-selected data. As mentioned in earlier paragraphs, the values corresponding to each node that are displayed via a grid data display interface may be dynamically updated based on fill updates being received from one or more exchanges. In one embodiment, when the values corresponding to the created nodes are updated based on the received fill data, the grid cells corresponding to the updated nodes may be automatically populated with the updated values. It should be understood that a trader or a system administrator may select the types of data to be displayed via each grid cell. For example, as will be shown in reference to FIG. 4, the displayed data may include risk data, such as P/L related data including the highest, lowest, or current P/L values, as well as net position related information for a single trader or a group of traders. However, it should be understood that the grid display interface could also display different types of node-related risk data.

FIG. 4 is a block diagram illustrating a risk display interface 400 including a data space 402 and a grid display 404 according to one example embodiment. While FIG. 4, as well as subsequent Figures, illustrates interfaces including a data space and a grid display, the two could be alternatively displayed separately, such as using separate windows. The data space 402 has been described in reference to FIG. 3. The grid display 404 is a two-dimensional grid arranged in a number of rows and columns that form grid cells, and each cell in the grid display 404 corresponds to a single node or a sub-node in the tree-based data space 402.

The risk data corresponding to each selected node in the tree-based data space 402 is displayed via a number of cells on the grid display interface 404. More specifically, the risk data corresponding to each selected node is mapped to cells of the grid display interface 404. In one embodiment, risk data corresponding to the highest ranked nodes, such as the nodes corresponding to each main account, are displayed in cells of the first column of the grid display 404, and the lower ranked sub-nodes corresponding to each main account node are displayed in the rows corresponding to their respective account nodes. Based on such configuration, the account node ("ACCT") corresponding to a sum of all account nodes associated with five traders, as well as the highest ranked nodes associated with each of the five traders, such as Trader 1, Trader 2, Trader 3, Trader 4, and Trader 5, are mapped to cells in the first column. Then, sub-nodes corresponding to different accounts or different tradeable objects associated with each respective trader may be displayed to the right of the cell corresponding to the main account node of that trader. For example, the main node associated with Trader 2 ("TRAD 2") is mapped to the first column and the third row in the grid display interface 404, and each sub-node, such as sub-nodes FGBL Sep03 and ZN Sep03, corresponding to the tradeable objects being trader by Trader 2, are mapped to cells along the row corresponding to the main, highest rank TRAD 2 node associated with Trader 2.

Each data cell displays risk data associated with the corresponding node. In the embodiment illustrated in FIG. 4, the displayed risk data includes, as shown in column 412, the highest P/L ("H"), the lowest P/L ("L"), current P/L ("$"), and the current net position ("P"). It should be understood that the P/L may correspond to any user-configurable P/L type, such as net, realized, or open P/L. For example, the realized P/L may be calculated based on the executed sells and buys, such as Sells−Buys. Then, the net P/L may be calculated based on the executed sells and buys modified by the trader's net position and the current market position, e.g., (Sells−Buys)+(Net Position×Market Price). Then, the open P/L may be calculated based on the net P/L and the realized P/L, such as (Net P/L−Realized P/L). It should be understood that the trader may select any of the P/L types to be displayed via the grid display. It should be understood that risk related data to be displayed in relation to each cell are not limited to the data described above, and different risk data types could also be presented, such as working order quantities, partial fills, margin information, or any other statistical data determined based on any user-defined equations. For example, a trader may wish to view an average P/L value determined for a user-specified time period.

Referring back to FIG. 4, the "ACCT" grid cell 414 is a sum of the accounts associated with five traders and will be used as a reference to define different types of data that can be displayed via each grid cell. The grid cell 414 displays the highest P/L value of $1342.68, the lowest P/L value of −$1707, and the current P/L value of $666.61. Then, the net position indicator "P" defines the net position as "Open." The Open position indicates that at least one of the five traders has a non-zero net position for at least one of the tradeable objects being traded by that trader. It should be understood that the net position may be calculated based on current executed buys and sells, such as Sells-Buys. However, it should be understood that the net position can be calculated in many different ways, for example. It should be understood that a user can control what type of Net Position or P/L is displayed via the P/L grid. In one embodiment, the grid may alternatively display net positions and/or P/L values calculated based on different formulas upon receiving predetermined user selection inputs. For example, one selection input may cause the P/L grid to display the Realized P/L and the Net Position calculated based on Sells and Buys, while another selection input may cause the P/L grid to display the Open P/L and the Net Position calculated based on working buy and sell orders in addition to executed buys and sells.

In one example embodiment, the higher ranked nodes don't include specific values corresponding to net positions, but rather indicate whether some of the sub-nodes are associated with non-zero net positions. Using the grid display 404, a system administrator may quickly determine which traders have non-zero net positions by simply examining the grid cells under the ACCT cell 414. As illustrated in FIG. 4, Traders 1, 2, and 4 have non-zero net positions. The system administrator may then refer to grid cells corresponding to each trader to determine specific net position values corresponding to one or more tradeable objects being traded by each trader. For example, Trader 1 holds net positions of −9 and 9 for two tradeable objects being traded by Trader 1, jFCE Aug and FESX, respectively, and Trader 2 holds net positions of −1 and 1 for tradeable objects FGBL Sep03 and ZN Sep03. Then, Trader 4 holds net positions of −2 and 6 for tradeable objects FDAX Sep03 and FESX Sep03.

However, it should be understood that the "closed" and "open" indicator could also be used to indicate other quantities. For example, the open indicator and the closed indicator could be used to indicate if a spread is hedged. In such an embodiment, one or more functions could be used to determine if contracts underlying a spread are hedged. For example, if a spread ratio for two contracts being spread is 1:1, and net positions of the two contracts are 9 and −9, the display cell created for the spread may display the "closed" indicator. In such an embodiment, a trader may wish to have two different indicators to be displayed, one indicator based on net positions associated with the underlying contracts and another indicator defining whether the contracts are hedged or not.

In addition to displaying numerical values, P/L could be also displayed graphically. FIG. 4 displays the P/L values using a thermometer type display which displays the current P/L value relative to the high and low P/L values. Referring to the ACCT grid cell 414, the indicator 408 corresponds to the zero P/L value. Then, bars 406 and 410 represent the current P/L value in relation to the highest and lowest P/L values, respectively. More specifically, the top of the bar 406 corresponds to the highest P/L value since the beginning of a trading session, and the bottom of the bar 406 corresponds to the current P/L value. Similarly, the top of the bar 410 corresponds to the current P/L value, and the bottom of the bar 410 corresponds to the lowest P/L value since the beginning of the trading session. Similarly to dynamically updating the numerical P/L values in each cell upon detecting a change in P/L values being calculated for each data node, the thermometer bar levels would be dynamically updated to reflect P/L increases and decreases.

Also, in one example embodiment, the tree-based data structure 402 automatically generates a new node upon detecting a new account or a new tradeable object being traded by one of the traders being managed by a system administrator, for example. When a new node is created, the grid display interface 404 could also automatically display P/L and net position values corresponding to the newly created node in one of the grid cells. The newly created grid cell could be displayed in any arbitrary and available location on the display grid interface 404, and could be color-coded such that it could be easily distinguished from other cells. Then, a trader or a risk administrator could easily merge the newly created node with another node in a tree-based data structure, such as a node corresponding to a trader's account under which the trader is trading the tradeable object.

FIG. 4 displays P/L values using the thermometer graph display; however, it should be understood that different graph types could also be used, and the example embodiments are not limited to the thermometer type display. In an alternative embodiment, each or some grid cells could include graphical charts of historical P/L values, or any other trader related data. Such graphical charts could be configured to transparently overlay the numerical values displayed in each cell, or could be displayed in the selected portion of a grid cell.

Also, values displayed via each grid cell could be color-coded based on any user preferences. For example, the current P/L values could be color-coded, and different colors could be selected based on whether the P/L value is positive or negative. In one embodiment, a green color could be used to color-code a positive P/L value, and a red color could be used to color-code a negative P/L value. Also, different colors could be used to represent a positive net position and a negative net position. Similarly, the bars 406 and 410 corresponding to the graphical representation of the P/L values could be color coded to differentiate relative values and to allow a system administrator or an individual trader to quickly assess the displayed P/L data. For example, the top bar 406 corresponding to the P/L loss could be red, and the bottom bar 410 corresponding to the P/L gain could be green. Also, in addition to color coding the values displayed in each grid cell, a trader or a system administrator could configure each cell such that some of the values or the entire cell may start flashing upon detecting a predetermined condition associated with one or more displayed values. For example, a grid cell or a value corresponding to the current P/L could start flashing or change colors upon detecting that the P/L has reached a pre-defined low level.

Also, it should be understood that the example embodiments are not limited to the grid display layout illustrated in FIG. 4, and different display configurations could be used as well. As described earlier, a trader or a risk manager administrator can select nodes that will be mapped to grid cells of the display grid. For example, only the highest rank nodes corresponding to each trader may be selected for display via the grid display so that a risk manager administrator may have an overall view of P/L and net position levels of all traders. Also, the highest rank nodes may be displayed horizontally, vertically, or at any angle selected by a trader or a risk manager administrator. Then, if a P/L corresponding to one of the displayed cells reaches an alarming low level, the risk administrator may decide to view the sub-nodes corresponding to the node associated with the problematic cell by expanding the number of the displayed sub-nodes. In another embodiment, the nodes displayed on the display grid can be automatically sorted, such as based on an alphabetical order, or based on some other criteria, such as by a contract date, by profit, loss, or net position being held in relation to each contract. For example, a system administrator may wish to be alerted which of the traders are associated with the highest loss. To do that, the system administrator may wish to view the nodes corresponding to the highest loss traders in the top row of the display.

Figure 5:
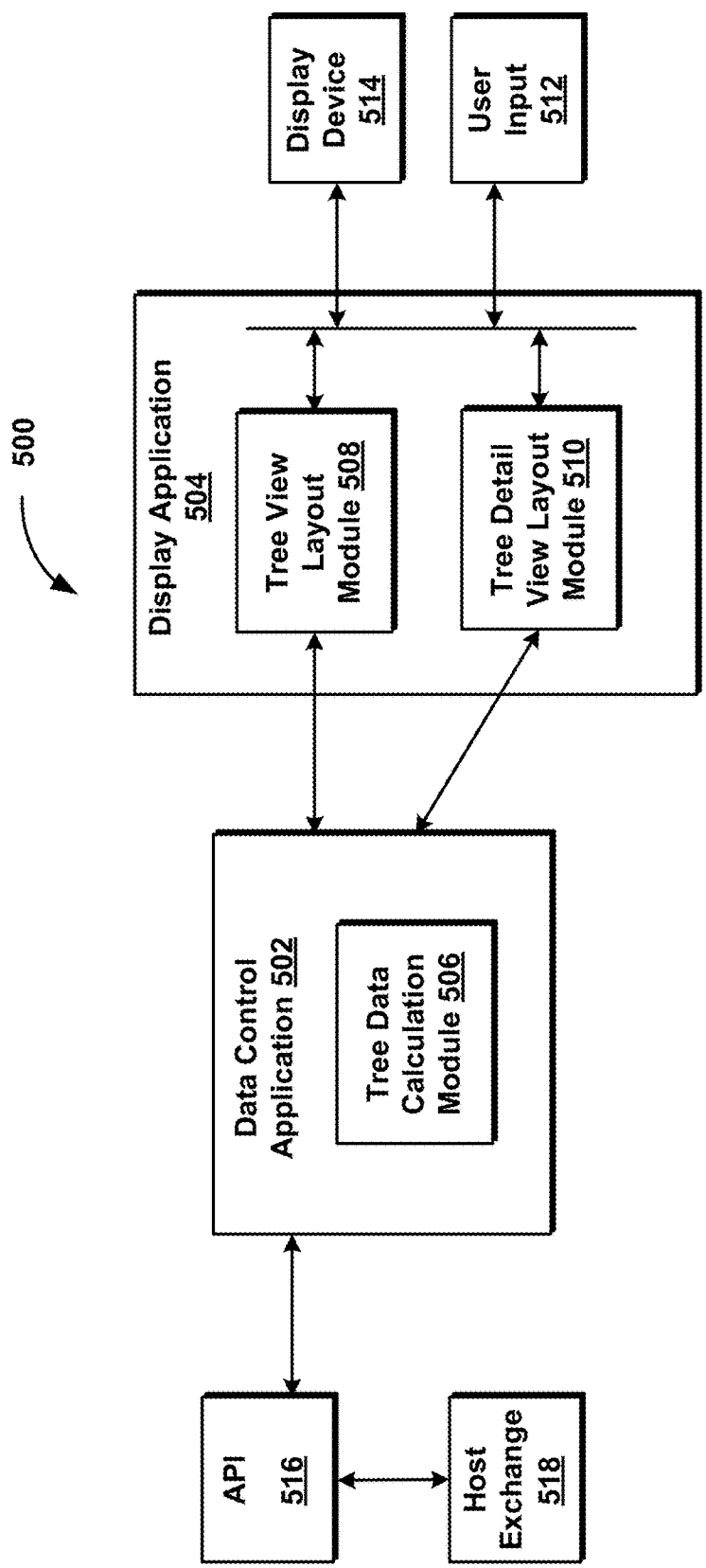
FIG. 5 is a block diagram illustrating an example system including a plurality of example components that can be used to provide the risk display interfaces described herein.

FIG. 5 is a block diagram illustrating a system 500 including a plurality of example components that can be used to provide the risk display interfaces described herein. The components described in relation to the system 500 can be located at the client device, gateway, or could be distributed among a plurality of computer-based or network entities. In addition, the functionality provided by the components can be integrated into the X_TRADER® available from Trading Technologies International, Inc. of Chicago, Ill. The system 500 includes a data control application 502 and a display control application 504. The data control application 502 includes a tree data calculation module 506. The display application 504 includes a tree view layout module 508 and a tree detail view layout module 510. It should be understood that the modules described herein can be distributed or grouped together, and the example embodiments are not limited to any specific configuration.

The tree data calculation module 506 has access to and receives market information from one or more host exchanges 518 via an API 516, such as an X_TRADER® API available from Trading Technologies International. In an embodiment where a risk information grid display is used by a system administrator who monitors activities of multiple traders, some of those traders may begin trading at different times. In such an embodiment, the tree data calculation module 506 may automatically detect when the traders start trading based on any fill data being received from the API 516. Upon detecting a new trader joining a trading session or one of the active traders starting to trade a new product, the data calculation module 506 may automatically start processing data associated with that trader and alert the display application 504 of the new tree node being added. For example, the data calculation module 506 may send a signal to the display application 504 to generate a new node to be added to the tree-based data structure and a new node to be displayed on a display grid. In the example embodiment illustrated in FIG. 5, the tree view layout module 508 may create a new node to the tree-based data structure so that a trader can see that new data has been detected, and the tree detail view layout module 510 may create a new data cell to be displayed on the display grid or any other display type being used by a trader. The tree-based data structure as well as the display grid can be displayed via the display device 514, such as a monitor or any other display means being used. In the example embodiment, the tree data calculation module 506 provides any calculated risk data to the tree detail view layout module 510 that can map the received data to specific cells on the display grid. It should be understood that the tree detail view layout module 510 can dynamically and continuously update any risk related data being displayed in relation to the cells on the display grid based on updates that are received from the tree data calculation module 502.

As mentioned in reference to the preceding figures, a user could also manipulate any nodes being displayed in relation to the display grid or a tree-based data structure. In the embodiment illustrated in FIG. 5, a user could manipulate the display or the data structure via a user input interface 512. When the user manipulates the tree based data structure, the user input may be processed by the tree view layout module 508. The manipulation of the tree based data structure may include adding new nodes, merging nodes, deleting nodes, or other operations. The tree view layout module 508 may change the tree based data structure to reflect the change as well as provide a signal to the tree detail view layout module 510 to change the display grid to reflect the change made in the tree data structure. For example, if a user decides to merge two nodes, while still wishing to view data related to the two separate nodes, the tree detail view layout module 510 may create a new node and position the new node on the grid based on any user preconfigured node position preferences. It should be understood that a trader could control whether the two individual nodes will be displayed in relation to the newly created combined node. Also, the tree view layout module 508 may send a signal to the tree data calculation module 506, and the signal may include information related to the newly added node. Then, the tree detail view layout module 510 may then start calculating data and providing the calculated data to the tree detail view layout module 510 for the newly created node.

IV. Alternative Risk Information Grid Displays

Figure 6:
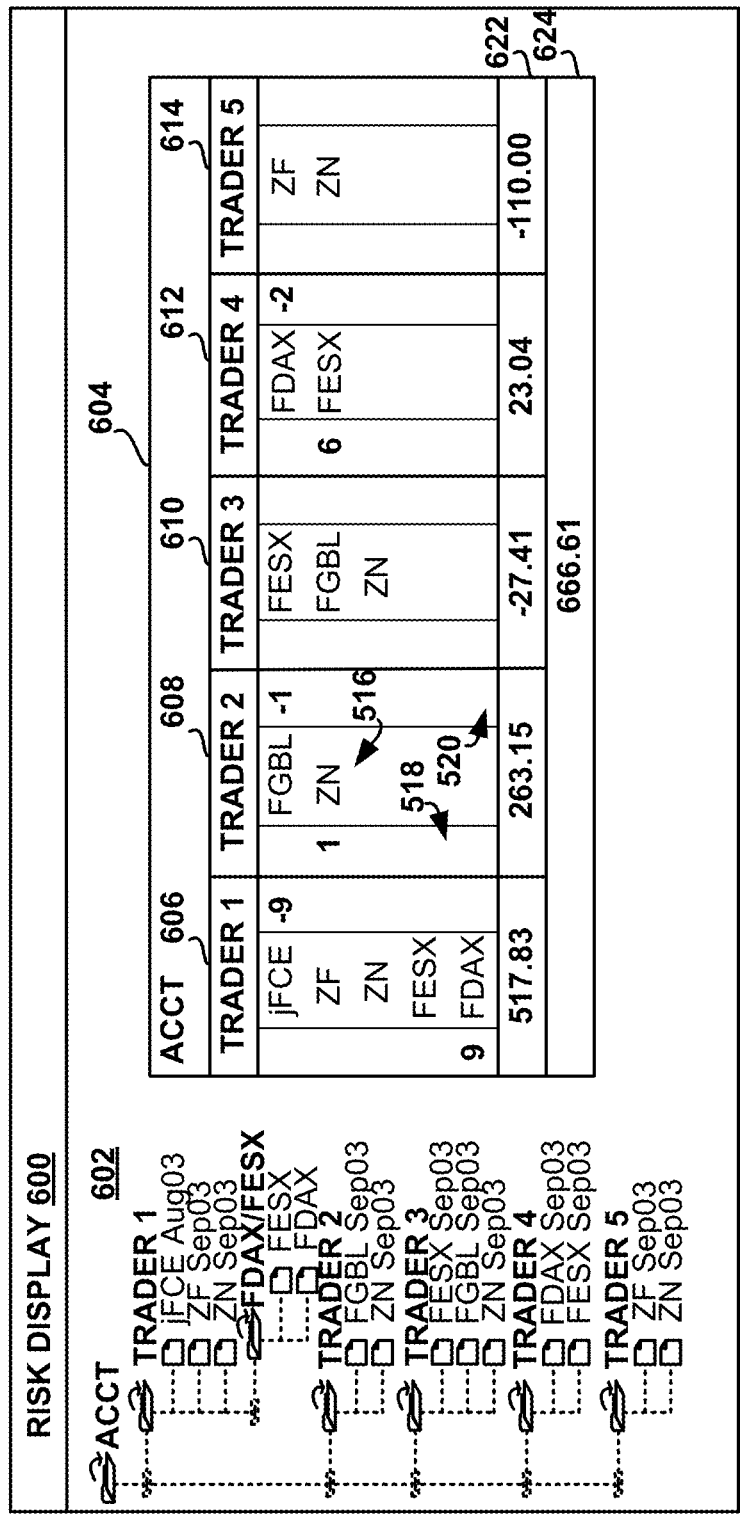
FIG. 6 is a block diagram illustrating a first alternative embodiment of a risk display interface according to one example embodiment.

FIG. 6 is an example view of a display of an alternative embodiment. The risk display interface 600 includes a data space 602 and a display grid 604. The data space 602 consists of a tree-based data set with a plurality of data nodes representing a plurality of risk data points, the details of which have been described in reference to FIGS. 3 and 4. The data space 602 also provides the ability to select and group the data nodes based on user preferences.

In the example embodiment illustrated in FIG. 6, the display grid 604 includes a plurality of display cells 606-614 corresponding to five risk data points (nodes) created for five traders, Trader 1-Trader 5. Also, rather than using a separate display cell for each tradeable object being traded by a trader, such as in the example embodiment illustrated in FIG. 4, each cell in FIG. 6 displays combined risk data sets associated with the sub-nodes corresponding to the node for which the cell has been created. In the example embodiment illustrated in FIG. 6, the indicators corresponding to the sub-nodes (tradeable objects, in this example) are aligned along a single common axis, and risk data corresponding to each sub-node is aligned with the respective identifier. Thus, for example, the first cell 606 of the display grid 604 displays risk data associated with five tradeable objects being traded by Trader 1. However, similarly to the embodiment described in reference to FIG. 4, a user could control which set of risk data nodes and sub-nodes are displayed in relation to the cells by closing/opening folders displayed in relation to the three-based data structure 602. It should be understood that different selection methods could also be used, such as using a copy function, dragging and dropping the selected nodes onto the grid display, and many others.

In one preferred embodiment, each cell includes a plurality of regions that display risk related information corresponding to each data point selected in relation to the higher rank sub-node. In the embodiment illustrated in FIG. 6, data displayed in each region is displayed in relation to a common price axis, so that, for example, identifiers corresponding to each sub-node, are displayed along a vertical axis, and risk data associated with each sub-node is aligned with the respective identifier being used for the sub-node. While, FIG. 6 illustrates an embodiment using a vertical orientation, different orientations are possible as well. For example, the identifiers could be displayed horizontally, and the respective risk data could be displayed on top and bottom of each respective identifier. Each data cell in FIG. 6 includes three regions arranged in columns, such as columns 616, 618, and 620 in the display cell 608. The second column 616 displays a plurality of identifiers associated with tradeable objects being traded by Trader 2, and the first column 618 displays long net positions, while the third column 620 displays short net positions. As illustrated in FIG. 6, the net position values correspond to and are aligned with each tradeable object identifier displayed in relation to the column 616, thus, allowing a system administrator to easily assess the net positions being held by Traders 1-5 in relation to each tradeable object. As generally illustrated at 622, each cell could also display a total P/L level calculated for a group of tradeable objects displayed in relation to each cell (not shown). In addition to displaying the total P/L values calculated for a group of tradeable object corresponding to each cell, another P/L value could be displayed that corresponds to a total P/L value calculated based on P/L values corresponding to the plurality of display cells. Such a P/L value that is a sum of the P/L values at 622 is displayed at 624, and in the embodiment illustrated in FIG. 6 is equal to 666.61.

It should be understood that the displayed cells are not limited to any number of entries, and the size of each cell may be automatically increased or decreased as the number of entries increases/decreases. In the embodiment illustrated in FIG. 6, the size of each cell in the illustrated row of cells is controlled by the size of the cell having the highest number of entries, such as the cell 606, which then results in some empty space left in relation to other cells, such as, in relation to the cells 608-614. However, alternatively, the number of entries corresponding to each cell may control the size of each cell, and the size of each cell may be automatically increased/decreased as the new entries are added/removed, such as, in this example, when one of the traders starts trading a new tradeable object. Also, the display grid is not limited to any number of display cells, and more or fewer cells could also be displayed as well. In the embodiment illustrated in FIG. 6, additional cells could be displayed in relation to another row of cells, such as below or above the illustrated cells.

Also, similarly to the embodiments described in relation to the earlier figures, the risk related data, such as net positions and P/L values, displayed in relation to the plurality of display cells 606-614 are preferably dynamically updated based on market data updates that are received from one or more exchanges so that the most up to date information can be displayed in relation to the display grid 604. It should be understood that a user may configure the types of risk related data to be displayed in relation to each display cell, and the example embodiments are not limited to displaying net position and P/L data, as will be described in relation to the subsequent figure.

FIG. 7 is a block diagram illustrating yet another alternative embodiment of a risk display interface 700. The risk display interface 700 includes a data space 702 and a display grid 704. The data space 702 consists of a tree-based data set and includes a plurality of data nodes representing a plurality of risk data points.

The display grid 704 includes a plurality of display cells 706-714 corresponding to the five risk data nodes. Also, rather than displaying the display cells in a row arrangement, such as illustrated in FIG. 7, the display cells 706-714 are displayed in a column format, and each cell includes risk data corresponding to the selected data nodes. Each data node includes a plurality of regions, such as a working buy orders column 716, a positive net position column 718, a tradeable object identifier column 720, a negative net position column 722, a working sell orders column 724, and a P/L column 726, all illustrated in relation to the display cell 706. Also, the display of tradeable objects is controlled so that the tradeable objects are displayed in the order of their expiration times. For example, referring to the cell 706, the tradeable objects ZT, ZF, ZN, and ZB are "2," "3," "5," and "10" year contracts, respectively. The risk data corresponding to the tradeable objects are aligned with the corresponding tradeable object identifiers. For example, referring to the display cell 706, the first tradeable object corresponding to the tradeable object identifier "ZT" is associated with the net position of −9, the P/L level of −1395.37, and 5 working buy orders. In addition to displaying the P/L values for each tradeable object, a total P/L value could also be displayed in relation to each cell, such as, for example, the total P/L level displayed at 728 and corresponding to a sum of P/L levels of all tradeable objects in the display cell 706. However, it should be understood that different types of risk data could be displayed in relation to each cell as well.

Some of the tradeable object identifiers displayed in the display cells may correspond to a spread being traded by a trader. Spread trading enables a trader to hedge against market losses should the market move against that trader's position. Essentially, hedging is a trading strategy that is made to reduce the risk of adverse price movement by taking an offsetting position in a related commodity. Spread trading in general is a style of trading that allows traders to limit the risk of the positions they take in the commodities by trading comparable commodities at comparable levels.

In one example embodiment, when the display cells include tradeable object indicators corresponding to one or more spreads, the display cells may indicate whether the net position corresponding to each spread leg is hedged or unhedged. For example, the net position displayed in relation to each cell may be highlighted to indicate that at least some of the quantity associated with the displayed net position is unhedged. However, it should be understood that different graphical indicators could be displayed in relation to the net positions to indicate that some of the quantity may be unhedged. Also, different indicators or different colors (such as color intensity) could be used to indicate different degrees of the position being unhedged. Further, alternatively, a user may wish to hear audio alerts whenever one or more of his spreads are unhedged. For example, if the spread ratio is 5:3, and the quantities corresponding to the spread legs are 50 and 30, the quantities are hedged. However, if the spread is not balanced, such as when the quantities corresponding to the spread legs are 50 and 40, for example, the quantity of 10 is an unhedged quantity. In such an embodiment, the quantity of 40, when displayed in the net position column in the display cell, may be highlighted using a predetermined user-configurable color, for example, to indicate that a portion of the quantity is unhedged.

According to one example embodiment, the trading application 202 can be used to determine whether the contracts underlying a spread are hedged or not. The trading application 202 can do that based on any finite ratios, or any user-configured formulas. Also, a user could define certain tolerances, in the form of ratios or percentages, that can be used by the trading application 202 to determine if the contracts are hedged. For example, ratios 10:7 and 10:6 may be used by the trading application 202 to conclude that the contracts are hedged. However, different variations are possible as well, and the example embodiments can be also applied in relation to spreads having more than two underlying contracts.

Figure 8:
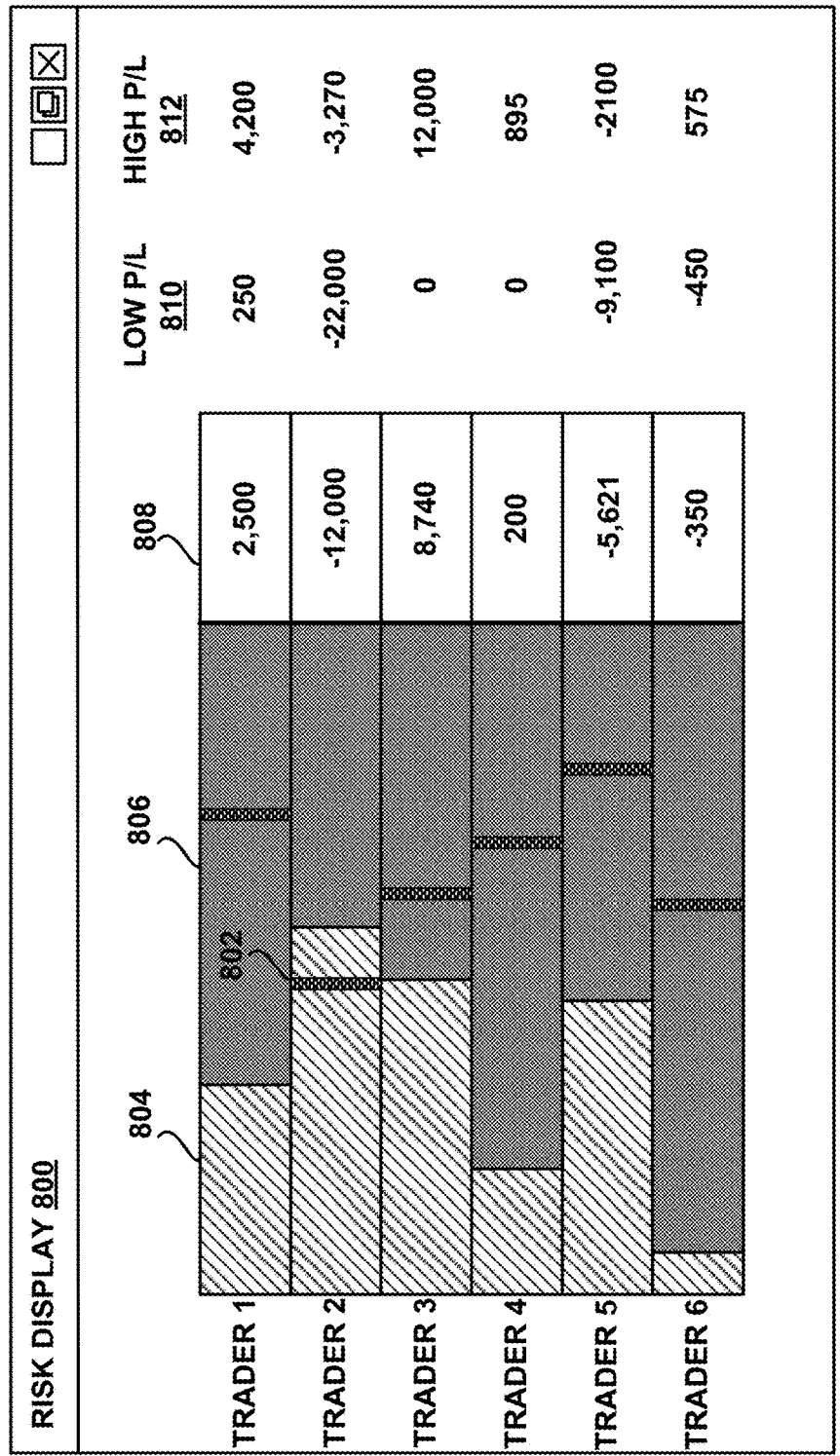
FIG. 8 is a block diagram illustrating a third example risk display interface according to one example embodiment.

FIG. 8 is a block diagram illustrating another example risk display interface 800 that can be used to display risk related information for one or more traders. The display interface 800 displays P/L related data, including current, high, and low P/L values, for a number of traders including Traders 1-6. However, it should be understood that the interface 800 could also display risk related data associated with nodes other than those related to the specific traders, such as account related data or tradeable object related data. The graphical interface 800 displays numerical values for the current P/L 808, the low P/L 810, and the high P/L 812 during a trading day. It should be understood that the high and low P/L values are not limited to the entire trading day, and the P/L values could be tracked for periods shorter or longer than the entire trading day. For example, as illustrated in FIG. 8, the high P/L level for Trader 1 is $4,200, and the low P/L level is $250. Also, the current P/L level for Trader 1 is $2,500. It should be understood that the P/L levels could be displayed in any user-selected currency, and example embodiments are not limited to any specific currency.

In addition to displaying P/L values numerically, the P/L information could be also displayed graphically, as illustrated in FIG. 8. However, rather than displaying the graphical indicators corresponding to each P/L value vertically, the thermometer type displays corresponding to each trader are displayed horizontally. For example, bars 804 and 806 display the current P/L position relative to the highest and lowest P/L values during a trading day or during any other user-configurable time period. More specifically, bar 804 displays the current P/L level compared to the lowest P/L level (represented by the left far end of the bar 804), and the bar 806 displays the current P/L level compared to the highest P/L level (represented by the right far end of the bar 806).

In addition to displaying the overall risk data related to each trader, the graphical interface 800 could also display risk information related to tradeable objects being traded by each trader. In such an embodiment, the thermometer type displays corresponding to tradeable objects being traded by Trader 1, for example, could be displayed directly below the graphical representation of the overall P/L values corresponding to Trader 1 illustrated in FIG. 8, for example. It should be understood that before the risk information is displayed using the graphical interface 800, a trader or a risk manager administrator could create a data space such as the one illustrated in FIG. 3. Using such a tree-based data space, a trader could then easily select different nodes, and the risk information corresponding to the selected nodes could be displayed via the graphical interface 800.

In addition to displaying profit level related information such as high, low, and current P/L levels, the graphical display could also be used to display other trader-related markers, such as a marker representing a certain percentage of available credit, or a marker representing allowable daily loss. Such markers could be displayed on the thermometer type displays corresponding to each trader. In an embodiment illustrated in FIG. 8, an indicator 802 may correspond to the percentage of an allowable daily loss defined for Trader 1. In the embodiment illustrated in FIG. 8, the combined length of bars 804 and 806 may correspond to 100%, and a trader may define the starting point of the scale at any end point of the combined bars. Similar indicators are displayed in relation to the thermometer interfaces created for Traders 2-6. For example, the zero marker of the scale may be on the far right side of the bar 806. In such an embodiment, the position of the marker 802 indicates that Trader 2 is at about 50% of the allowable daily loss. However, it should be understood that the scale could also be set such that the zero marker is on the far left of the bar 804, and the far right hand side of each bar corresponds to 100%. Also, rather than illustrating the allowable daily loss, the indicators could illustrate the available credit, such as a percentage of the available credit that has been used up by a trader, or a percentage of the available credit that is still available to a trader. The markers could also indicate margin related information, such as available credit.

However, it should be understood that more than one indicator could be displayed via the graphical interface, and the indicators could relate to the current as well as prior trading sessions. The trader could also control the graphical representation of each indicator and could set up different axis to correspond and control positions of different indicators.

Also, preferably, the graphical display for displaying risk information could be configured such that a risk manager administrator, for example, could remotely access the display using any remote client device having a browser. In such an embodiment, based on the client device being used, the display window could be formatted such that the displayed data would fit on a screen of the client device.

The above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for displaying risk information in an electronic trading environment may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method including:
displaying by a client device a data space using a tree-based structure including a plurality of trader nodes and a plurality of tradeable object nodes, wherein each tradeable object node in the plurality of tradeable object nodes is a sub-node of one of the plurality of trader nodes in the tree-based structure;
displaying by the client device a display grid including a plurality of display cells, wherein each trader node in the plurality of trader nodes and each tradeable object node in the plurality of tradeable object nodes is mapped to a different display cell, wherein the plurality of display cells are arranged by a number of rows and an number of columns, wherein the display cells corresponding to each of the plurality of trader nodes is in a different row, wherein the display cells corresponding to each of the plurality of tradeable object nodes are in the same row as the display cell of the corresponding trader node, wherein the display cells corresponding to each of the plurality of trader nodes are in an order corresponding to an order of the plurality of trader nodes in the data space;

displaying by the client device, for each tradeable object node of the plurality of tradeable object nodes, risk data related to the tradeable object node in the display cell corresponding to the tradeable object node;

receiving by the client device a command from a user input device to select a trader node in the tree-based structure and move the selected trader node to a new location in the tree-based structure in the data space;

updating by the client device the order of display cells corresponding to each of the plurality of trader nodes to a new order of the plurality of trader nodes in the data space after the move of the selected trader node;

receiving by the client device updated risk data related to a tradeable object node of the plurality of tradeable object nodes; and updating by the client device the display cell corresponding to the tradeable object node for which the updated risk data was received.

2. The method of claim 1, wherein each trader node in the plurality of trader nodes is a sub-node of one of a plurality of account nodes in the tree-based structure.

3. The method of claim 1, wherein the data space and the display grid are displayed adjacent to each other.

4. The method of claim 1, wherein the risk data includes profit/loss (P/L) data.

5. The method of claim 4, wherein the P/L data includes at least one of a current P/L value, a high P/L value, and a low P/L value during a predetermined time period.

6. The method of claim 5, further including:
displaying by the client device in a display cell in the plurality of display cells a thermometer display indicating a current P/L value associated with a tradeable object node corresponding to the display cell in relation to high and low P/L values for the tradeable object node during the predetermined time period.

7. The method of claim 1, wherein the risk data includes net position data.

8. The method of claim 7, further including:
determining by the client device if there is an unhedged position based on the net position data; and
displaying by the client device an indicator in relation to a net position value to indicate the unhedged net position.

9. The method of claim 1, wherein the risk data is received from at least one electronic exchange.

10. The method of claim 1, wherein the risk data is displayed using numeric values.

11. The method of claim 1, wherein the risk data is displayed using graphical bars.

12. The method of claim 1, further including:
receiving by the client device a command to add a new trader node to the tree-based structure, wherein the new trader node was not in the plurality of trader nodes;

displaying by the client device the new trader node in the tree-based structure in the data space; and displaying by the client device a new display cell in the display grid, wherein the new display cell was not in the plurality of display cells, wherein the new trader node is mapped to the new display cell, wherein the new display cell is in a new row of the display grid, wherein the new display cell is in an order corresponding to an order of both the plurality of trader nodes and the new trader node in the data space.

13. The method of claim 1, further including:
receiving by the client device a command to add a new tradeable object node to the tree-based structure, wherein the new tradeable object node is for a first trader node in the plurality of trader nodes, wherein the new tradeable object node was not in the plurality of tradeable object nodes;

displaying by the client device the new tradeable object node in the tree-based structure in the data space as a sub-node of the first trader node; and displaying by the client device a new display cell in the display grid, wherein the new display cell was not in the plurality of display cells, wherein the new tradeable object node is mapped to the new display cell, wherein the new display cell is in the same row as the display cell corresponding to the first trader node.

14. The method of claim 1, wherein the command is a drag-and-drop command.

15. The method of claim 1, further including:
displaying by the client device, for each trader node of the plurality of trader nodes, risk data related to the trader node in the display cell corresponding to the trader node;

receiving by the client device updated risk data related to a trader node of the plurality of trader nodes; and updating by the client device the display cell corresponding to the trader node for which the updated risk data was received.

16. The method of claim 15, wherein the risk data includes profit/loss (P/L) data.

17. The method of claim 16, wherein the P/L data includes at least one of a current P/L value, a high P/L value, and a low P/L value during a predetermined time period.

18. The method of claim 17, further including:
displaying by the client device in a display cell in the plurality of display cells a thermometer display indicating a current P/L value associated with a trader node corresponding to the display cell in relation to high and low P/L values for the trader node during the predetermined time period.

* * * * *